(12) United States Patent
Choi et al.

(10) Patent No.: US 9,150,196 B2
(45) Date of Patent: Oct. 6, 2015

(54) HEATING ELEMENT AND METHOD FOR MANUFACTURING SAME

(71) Applicant: LG CHEM, LTD., Seoul (KR)

(72) Inventors: Hyeon Choi, Daejeon (KR); Ki-Hwan Kim, Daejeon (KR); Sujin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/149,539

(22) Filed: Jan. 7, 2014

(65) Prior Publication Data

US 2014/0117003 A1    May 1, 2014

Related U.S. Application Data

(63) Continuation of application No. PCT/KR2013/002356, filed on Mar. 21, 2013.

(30) Foreign Application Priority Data

Mar. 21, 2012    (KR) .................. 10-2012-0028572

(51) Int. Cl.
    *H05B 3/84*       (2006.01)
    *B60S 1/02*       (2006.01)
    *H01C 17/06*      (2006.01)
    *H05B 3/00*       (2006.01)
    *H05B 3/26*       (2006.01)

(52) U.S. Cl.
    CPC ............ *B60S 1/026* (2013.01); *H01C 17/06* (2013.01); *H05B 3/0028* (2013.01); *H05B 3/265* (2013.01); *H05B 3/84* (2013.01); *H05B 2203/007* (2013.01); *H05B 2203/013* (2013.01); *Y10T 29/49083* (2015.01)

(58) Field of Classification Search
    CPC ............... H05B 3/84; H05B 2203/013; H05B 2203/017; H05B 2203/002; H05B 3/08
    USPC .......... 219/203, 202, 219, 522, 539, 543, 553
    See application file for complete search history.

(56) References Cited

U.S. PATENT DOCUMENTS

| | | | | |
|---|---|---|---|---|
| 2,557,983 | A * | 6/1951 | Linder | 219/543 |
| 3,721,595 | A * | 3/1973 | Tarnopol et al. | 156/89.17 |
| 3,729,616 | A * | 4/1973 | Gruss et al. | 219/522 |
| 4,971,848 | A * | 11/1990 | Ruelle et al. | 428/38 |
| 6,891,517 | B2 * | 5/2005 | Voeltzel | 343/909 |
| 7,190,326 | B2 * | 3/2007 | Voeltzel | 343/909 |
| 2008/0290084 | A1 | 11/2008 | Winscom et al. | |
| 2009/0014426 | A1 * | 1/2009 | Baumler | 219/203 |
| 2010/0200286 | A1 * | 8/2010 | Melcher et al. | 174/261 |
| 2010/0213183 | A1 * | 8/2010 | Schall | 219/203 |
| 2010/0270280 | A1 * | 10/2010 | Blanchard et al. | 219/203 |

(Continued)

FOREIGN PATENT DOCUMENTS

| | | |
|---|---|---|
| JP | 2010-205432 A | 9/2010 |
| JP | 2012014945 A1 | 1/2012 |

(Continued)

*Primary Examiner* — Dana Ross
*Assistant Examiner* — Lawrence Samuels
(74) *Attorney, Agent, or Firm* — Dentons US LLP (57) ABSTRACT

The present specification relates to a heating element in which a heating value for each region is controlled or a heating element in which the heating value for each region is controlled and which is inconspicuous, and a method for manufacturing the same.

15 Claims, 10 Drawing Sheets

(56) References Cited

U.S. PATENT DOCUMENTS

| | | | | |
|---|---|---|---|---|
| 2011/0017719 A1* | 1/2011 | Choi et al. | | 219/260 |
| 2011/0017726 A1* | 1/2011 | Choi et al. | | 219/552 |
| 2011/0017727 A1* | 1/2011 | Choi et al. | | 219/552 |
| 2011/0042370 A1* | 2/2011 | Choi et al. | | 219/553 |
| 2011/0062146 A1* | 3/2011 | Kuriki | | 219/553 |

FOREIGN PATENT DOCUMENTS

| | | |
|---|---|---|
| JP | 2012014956 A | 1/2012 |
| KR | 1019980042656 U | 9/1998 |
| KR | 200186346 Y1 | 6/2000 |
| KR | 10-2009-0099502 A | 9/2009 |

\* cited by examiner

HEATING ELEMENT AND METHOD FOR MANUFACTURING SAME

This application is a Continuation Bypass Application of International Patent Application No. PCT/KR2013/002356, filed Mar. 21, 2013, which claims priority to and the benefit of Korean Patent Application No. 10-2012-0028572, tiled on Mar. 21, 2012 in the Korean Intellectual Property Office, all of which are hereby incorporated by reference in their entirety.

TECHNICAL FIELD

The present invention relates to a heating element and a manufacturing method thereof. More particularly, the present invention relates to a heating element in which a heating value for each region is controlled, and a manufacturing method thereof.

BACKGROUND ART

When there is a temperature difference between the outside and the inside of a vehicle, moisture or frost is formed on windows of the vehicle. Further, in the case of an indoor ski rink, condensation occurs due to a temperature difference between the inside with a slope and the outside of the slope. In order to solve the problems, heating glass may be used. The heating glass uses a concept of generating heat from a heating line by attaching a heating line sheet to the glass surface or directly forming the heating line on the glass surface and applying electric power to both terminals of the heating line, thereby increasing a temperature of the glass surface.

In order to manufacture the heating glass, there have been proposed methods of forming a total surface heating layer through a sputtering process using a transparent conductive material such as an indium tin oxide (ITO) or an Ag thin film and then connecting an electrode to a front end thereof. However, there is a problem in that it is difficult to drive the heating glass manufactured by the methods at low voltage due to high surface resistance. Accordingly, when heat is to be generated at low voltage, attempts have been proposed to use a heating line such as a metal line.

DETAILED DESCRIPTION OF THE INVENTION

Technical Problem

In a heating element, a heating value for each region may be required to be controlled according to the use thereof. In addition, a characteristic that a heating value for each region may be controlled while being inconspicuous to a user according to the use thereof may be required for the heating element. In order to satisfy the aforementioned required characteristics, the present inventors have repeatedly studied on a heating element in which a heating value for each region is controlled, or a heating element in which a heating value for each region is controlled and which is inconspicuous to a user, thereby completing the present invention.

Technical Solution

An exemplary embodiment of the present invention provides a heating element comprising:
a base material;
a conductive heating pattern provided on the base material; and
two bus bars provided so as to apply voltage to both ends of the conductive heating pattern, respectively,
in which the conductive heating pattern comprises a pattern in which the number of lines is controlled in at least some regions in a pattern comprising lines connecting vertices constituting a border of a closed figure having at least three vertices, according to a distance from the bus bar or along a longitudinal direction of the bus bar.

Another exemplary embodiment of the present invention provides a method for manufacturing a heating element, the method comprising:
forming a conductive heating pattern on a base material; and
forming two bus bars on the base material so as to apply voltage to both ends of the conductive heating pattern,
in which the conductive heating pattern comprises a pattern in which the number of lines is controlled in at least some regions in a pattern comprising lines connecting vertices constituting a border of a closed figure having at least three vertices, according to a distance from the bus bar or along a longitudinal direction of the bus bar.

Advantageous Effects

According to an exemplary embodiment of the present invention, it is possible to provide a heating element in which a heating value for each region is controlled. Furthermore, according to another exemplary embodiment of the present invention, it is possible to provide a heating element in which a heating value for each region is controlled and which is inconspicuous to a user.

BEST MODE

Hereinafter, the present invention will be described in more detail.

A heating element according to an exemplary embodiment of the present invention comprises: a base material; a conductive heating pattern provided on the base material; and two bus bars provided so as to apply voltage to both ends of the conductive heating pattern, in which the conductive heating pattern comprises a pattern in which the number of lines is controlled in at least some regions in a pattern comprising lines connecting vertices constituting a border of a closed figure having at least three vertices, according to a distance from the bus bar or along a longitudinal direction of the bus bar.

In the present invention, a heating value may be controlled according to a distance from the bus bar or along a longitudinal direction of the bus bar by varying the number of lines according to a distance from the bus bar or along the longitudinal direction of the bus bar in at least some regions in a pattern comprising lines connecting the vertices constituting the border of a closed figure. Specifically, a resistance value between the two bus bars is determined by the number of lines connecting the vertices constituting the border of a closed figure constituting the conductive heating pattern, and a heating element having a different heating value for each region may be provided by controlling the number of lines.

In the present specification, the lines connect the vertices constituting the border of a closed figure having at least three vertices, and each of the lines may be composed of a straight line, a curved line, a zig-zag line, or a combination thereof. Here, the vertex means a point where the lines meet each other, and is interpreted as occupying no area.

Figure 1:
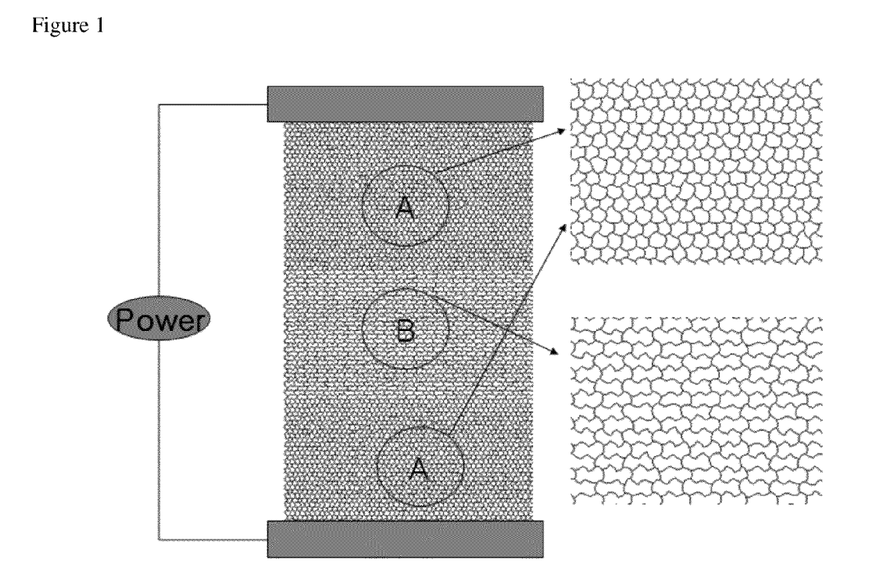
FIG. 1 illustrates a form in which the number of lines of a polygon constituting a conductive heating pattern is controlled according to a distance from a bus bar.

For example, FIG. 1 illustrates an example in which the number of lines is controlled according to a distance from the bus bar. In the conductive heating pattern of the heating element illustrated in FIG. 1, the number of lines is controlled to be different in three regions divided according to the distance from the bus bar, that is, A, B, and A'. That is, the number of lines in region B is designed to be smaller than those in A and A' regions.

The closed figure having at least three vertices is a polygon having at least three vertices or a figure modified therefrom. The modification method will be described below.

In the present invention, the conductive heating pattern may comprise a form of lines connecting vertices constituting the border of closed figures having the same number of vertices, but may comprise a form of lines connecting vertices constituting the border of two or more closed figures having different numbers of vertices. For example, the conductive heating pattern may comprise lines connecting vertices constituting the border of closed figures having four vertices. As another example, the conductive heating pattern may be a pattern comprising lines connecting vertices constituting the border of closed figures having six vertices. As yet another example, in a form in which closed figures having three to eight vertices are mixed, the conductive heating pattern may comprise lines connecting vertices constituting the border of the closed figures.

As an example, in a pattern comprising lines connecting vertices constituting the border of a closed figure having four to six vertices, the conductive heating pattern has a pattern in which the number of lines is controlled according to a distance from the bus bar or along a longitudinal direction of the bus bar.

In the present invention, when the number of lines is varied according to a distance from the bus bar or along a longitudinal direction of the bus bar, the lines having different numbers are not particularly limited as long as the lines constitute the border of the closed figure.

Figure 2:
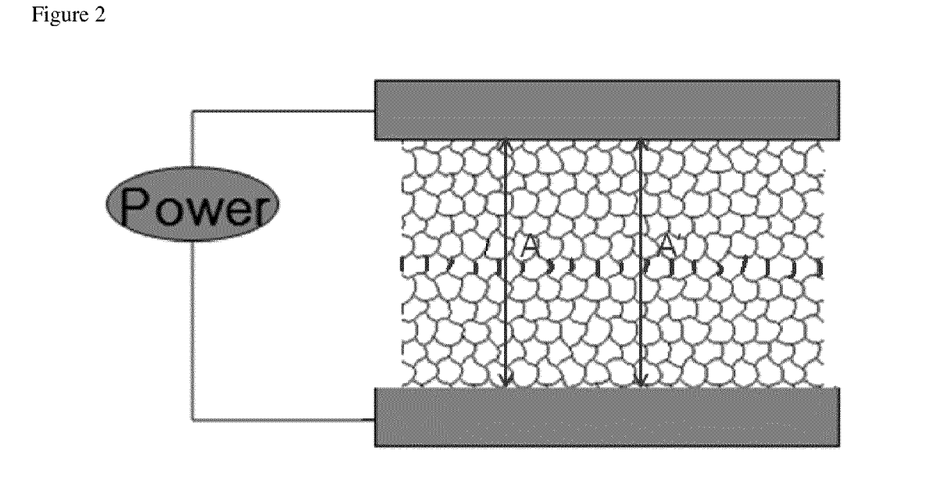
FIG. 2 illustrates lines of which the number needs to be controlled in a pattern in order to manufacture a heating element according to an exemplary embodiment of the present invention.

For example, when the conductive heating pattern is constituted so as to comprise a line connecting vertices constituting the border of a closed figure having four or six vertices, it is possible to control the number of lines facing each other based on a distance direction between two bus bars according to the distance from the bus bar or along the longitudinal direction of the bus bar. For example, when the distance between the two bus bars is indicated as A and A' of FIG. 2, it is possible to control the number of lines disposed in parallel with the distance direction and facing each other, that is, lines disposed in the same direction as the lines indicated as red in FIG. 2.

As another example, when the conductive heating pattern is composed of lines constituting the border of a tetragon or hexagon, it is possible to control the number of lines where the extended line among the lines forms a joint angle from 45 degrees to 90 degrees with one of the bus bars, according to the distance from the bus bar or along the longitudinal direction of the bus bar.

As yet another example, when the conductive heating pattern is composed of lines constituting a rectangle, a regular tetragon, a hexagon or a regular hexagon, or lines constituting the border of a form modified from the figures, the lines having different numbers may be lines in the vertical direction compared to the longitudinal direction of the bus bar among lines constituting the border of the rectangle, the regular tetragon, the hexagon or the regular hexagon.

As a specific example, in a pattern composed of a figure selected from the group consisting of a regular tetragon, a rectangle, a regular hexagon and a hexagon having two lines in the vertical direction compared to at least one of the bus bars, or a modified figure formed by modifying the position of the vertex or the curvature degree of line from the figure, the conductive heating pattern has a pattern in which the number of lines in the vertical direction compared to the bus bar is controlled in a pre-modified form of the figure or the modified figure according to a distance from the bus bar or along a longitudinal direction of the bus bar.

As a more specific example, the conductive heating pattern may be designed by a pattern modified from the regular hexagon. In a honeycomb structure comprising lines constituting the border of a regular hexagon indicated in FIG. 3, the resistance value between the bus bars may be determined by the number of lines indicated as Nos. 3 and 4 among the lines indicated in FIG. 3.

Figure 3:
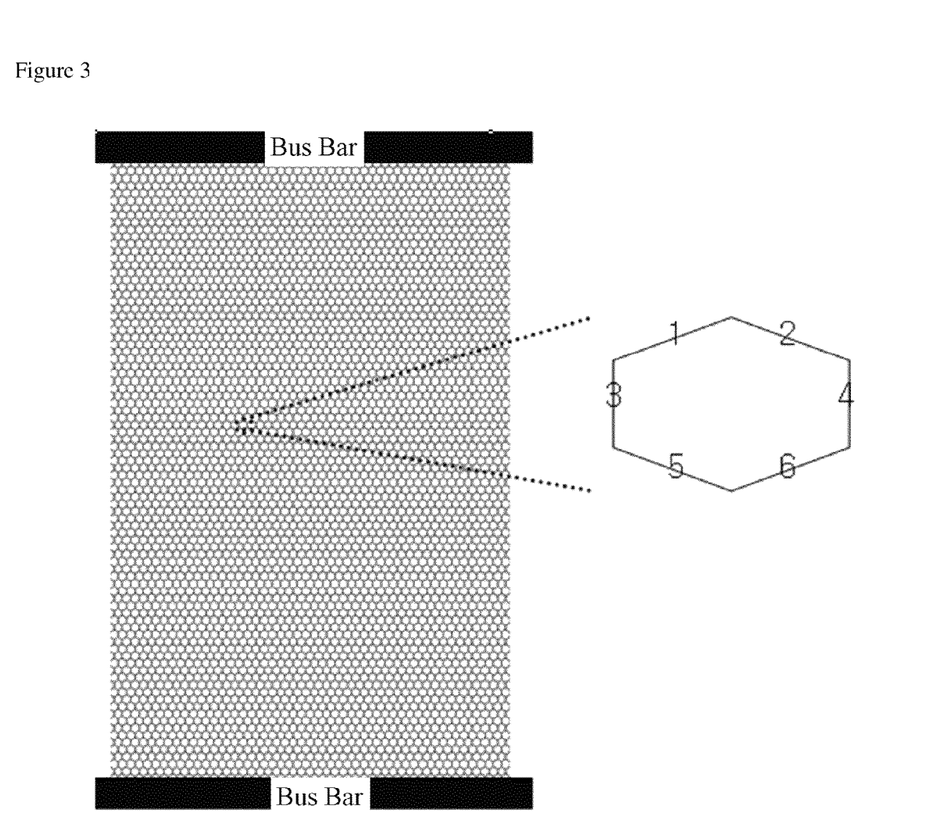
FIG. 3 illustrates a pattern composed of lines of a regular hexagon.

That is, when electric current flows due to voltage applied between the bus bars, the lines indicated as Nos. 1, 2, 5 and 6 may be connected with each other through other lines even though one of the lines is removed, but the lines indicated as Nos. 3 and 4, which serve as a connection path between the bus bars, lead to an increase in resistance value when removed therefrom.

Figure 4:
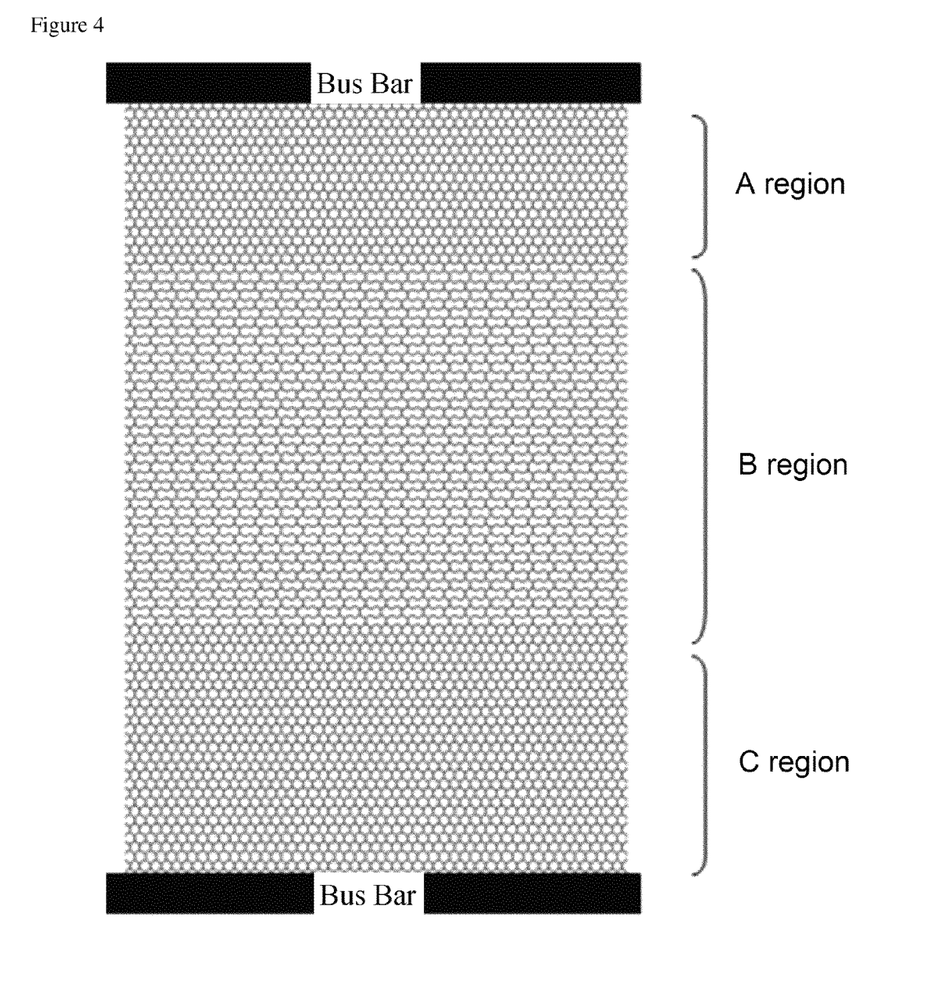
FIG. 4 illustrates an example in which from the pattern illustrated in FIG. 3, the number of lines constituting the pattern is controlled according to a distance from the bus bar.

Accordingly, in the pattern illustrated in FIG. 3, when the ratio of the average number of lines indicated as Nos. 3 and 4 of each of regular hexagons in each region is changed into a ratio of 2:1:2 after the region is divided from the upper portion into three regions, that is, A, B and C, the pattern illustrated in FIG. 4 may be obtained.

The ratio of the surface resistance values of the three regions in FIG. 4 has an inverse proportional relationship with the ratio of the average numbers of lines indicated as Nos. 3 and 4, and the ratio of the heating value per area for each region is 1:2:1 because the three regions become connected in series and thus have the same current value.

Figure 5:
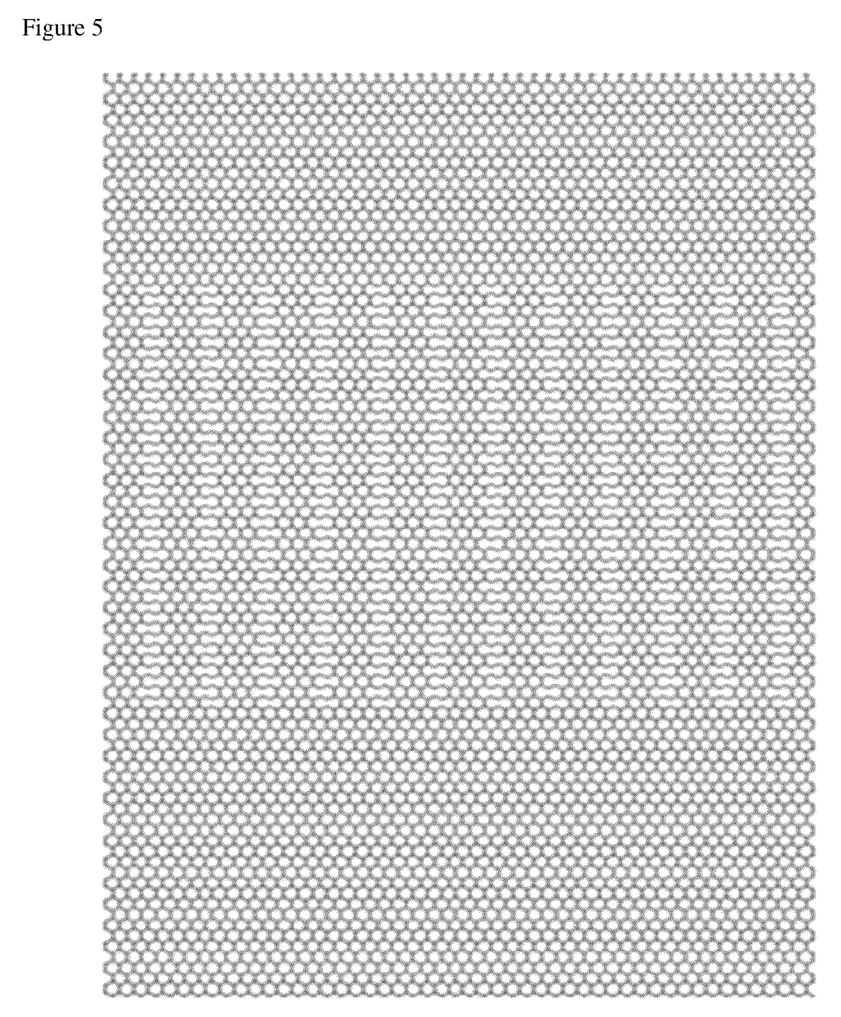
FIGS. 5 and 6 illustrate an example in which the number of lines constituting the pattern is controlled according to a distance from the bus bar.
Figure 6:
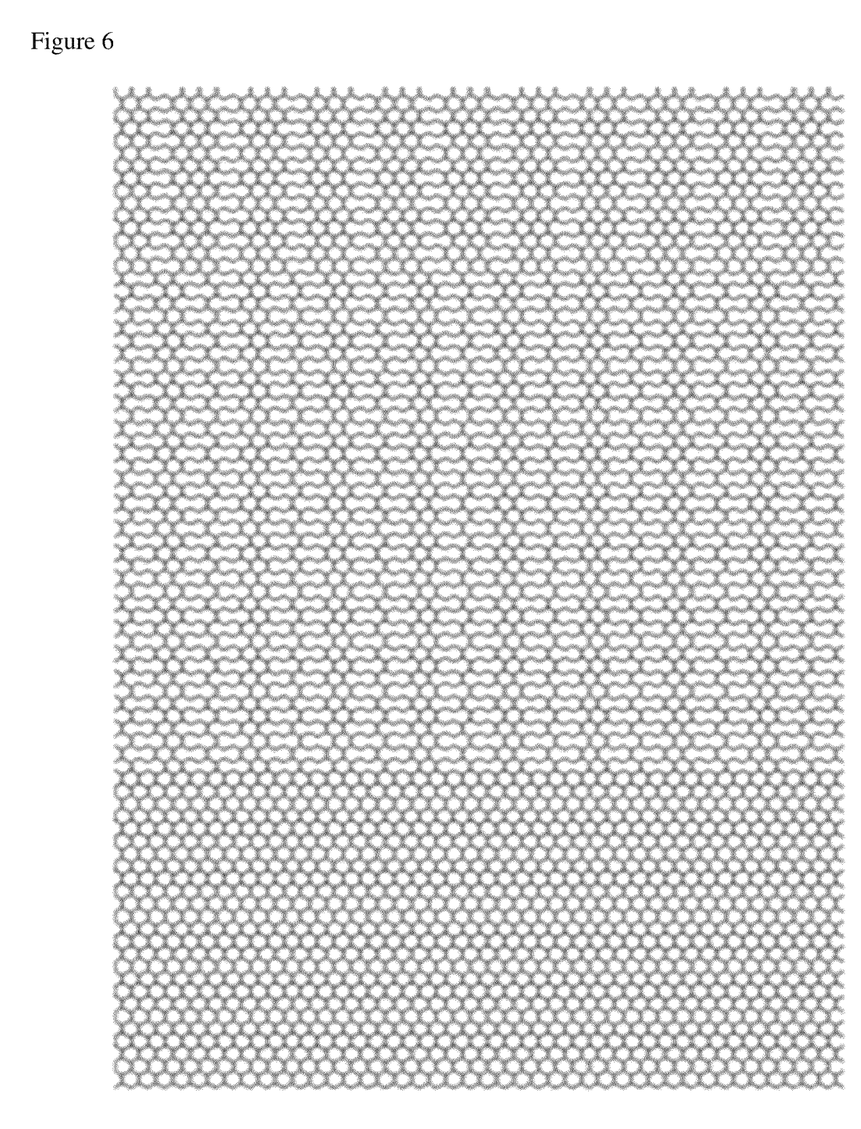

As a specific example, the heating value per area may be controlled to 3:4:3 or 3:5:4 for each region by changing the ratio of numbers of respective lines of regular hexagons to 4:3:4 or 20:12:15 from 2:1:2. FIGS. 5 and 6 illustrate the examples thereof. The following FIG. 5 illustrates an example in which the conductive heating pattern is designed by controlling the ratio of the numbers of sides of Nos. 3 and 4 for each region from the regular hexagon to 4:3:4, and the following FIG. 6 illustrates an example in which the conductive heating pattern is designed by controlling the ratio of the numbers of sides Nos. 3 and 4 for each region from the regular hexagon to 20:12:15.

In the present specification, a value, which is obtained by converting an area, which the pattern comprising lines constituting the border of the closed figure does not occupy, into a ratio with respect to the total area, may be defined as an aperture ratio. As described above, when the number of lines constituting the border of the closed figure is controlled according to the distance from the bus bar or along the longitudinal direction of the bus bar, the difference in aperture ratio for each region may be controlled so as to be 2% or less, preferably 1% or less. In this case, it is possible to perform defrost and remove frosts from a region having a large heating value by achieving uniform heating characteristics for each region, and to prevent a boundary caused by a difference in aperture ratios between regions from being recognized to a user.

Figure 7:
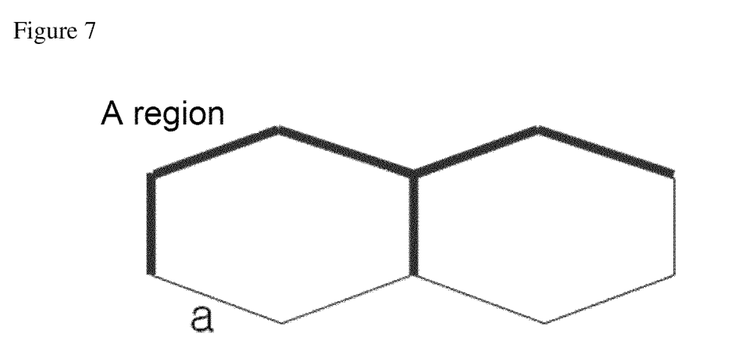
FIG. 7 illustrates a basic figure for designing a pattern of region A of FIG. 2.
Figure 8:
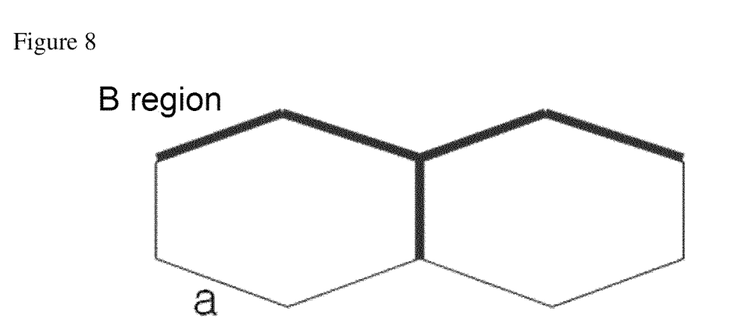
FIG. 8 illustrates a basic figure for designing a pattern of region B of FIG. 2.

For example, the aperture ratio in the regular hexagonal structure of FIG. 3 may be calculated as follows. As illustrated in FIGS. 7 and 8, when the length of a line is defined as a and the line width is defined as w, the area of the two regular hexagons is $3^{3/2}a^2$, the area of six lines (indicated as red) in region A is 6wa, and the area of five lines (indicated as red) in region B is 5wa. Accordingly, the aperture ratio (%) may be calculated as $100*[1-(6/3^{3/2})w/a]$ in region A and as $100*[1-(5/3^{3/2})w/a]$ in region B. When the difference in aperture ratio for each region according to the length (a) and the line width (w) of the line constituting the border of the closed figure is calculated according to the equations, a result in the following Table 1 is obtained.

TABLE 1

| a (μm) | W (μm) | Aperture ratio of Region A (%) | Aperture ratio of Region B (%) | Difference |
|---|---|---|---|---|
| 100 | 3 | 96.54 | 97.11 | 0.58 |
| 200 | 3 | 98.27 | 98.56 | 0.29 |
| 300 | 3 | 98.85 | 99.04 | 0.19 |
| 400 | 3 | 99.13 | 99.28 | 0.14 |
| 500 | 3 | 99.31 | 99.42 | 0.12 |
| 600 | 3 | 99.42 | 99.52 | 0.10 |
| 700 | 3 | 99.51 | 99.59 | 0.08 |
| 800 | 3 | 99.57 | 99.64 | 0.07 |
| 100 | 5 | 94.23 | 95.19 | 0.96 |
| 200 | 5 | 97.11 | 97.59 | 0.48 |
| 300 | 5 | 98.08 | 98.40 | 0.32 |
| 400 | 5 | 98.56 | 98.80 | 0.24 |
| 500 | 5 | 98.85 | 99.04 | 0.19 |
| 600 | 5 | 99.04 | 99.20 | 0.16 |
| 700 | 5 | 99.18 | 99.31 | 0.14 |
| 800 | 5 | 99.28 | 99.40 | 0.12 |
| 100 | 10 | 88.45 | 90.38 | 1.92 |
| 200 | 10 | 94.23 | 95.19 | 0.96 |
| 300 | 10 | 96.15 | 96.79 | 0.64 |
| 400 | 10 | 97.11 | 97.59 | 0.48 |
| 500 | 10 | 97.69 | 98.08 | 0.38 |
| 600 | 10 | 98.08 | 98.40 | 0.32 |
| 700 | 10 | 98.35 | 98.63 | 0.27 |
| 800 | 10 | 98.56 | 98.80 | 0.24 |

In the present invention, when a conductive heating pattern is designed based on a regular hexagonal structure, the length of lines constituting the pattern is preferably a value from 100 μm to 800 μm. Further, the line width of lines constituting the conductive heating pattern is a value from 0.1 μm to 30 μm, more specifically from 3 μm to 10 μm.

In the present invention, when the number of lines constituting the pattern is controlled according to the distance from the bus bar or along the longitudinal direction of the bus bar, the number of lines may be controlled to be different for each region. For example, the present invention may comprise two or more regions having different average numbers of lines per unit area.

In this case, the conductive heating pattern may be designed such that the ratio of the average numbers of lines per unit area among the two or more regions is an integer ratio. For example, the ratio of the average numbers of lines per unit area for regions is preferably a value from 0.8 to 1. In this case, the ratio is a ratio of a small value in average number of lines per unit area to a large value in average number of lines per unit area.

For example, in FIG. 4, the ratio of the average numbers of lines per unit area of region B with respect to region A is 5/6, that is, a value of 0.83, and in FIGS. 5 and 6, the ratio of the average numbers of lines per unit area of regions, in which the ratio of the numbers of lines is indicated as 4:3:4 and 20:12:15, is a value of 1:11/12:1 (1:0.92:1) and 1:13/15:11/12 (1:0.87:0.92), respectively.

FIGS. 3 to 7 describe examples in which the three regions are comprised, but the examples are not limited to the three regions. Even when two or four or more regions are comprised, the conductive heating pattern may be designed such that the ratio of the average values of lines per unit area among the regions is an integer ratio.

When the conductive heating pattern is composed of a metal line, the density and line width of the line may be controlled in order to prevent a problem in that the conductive heating pattern is conspicuous due to reduction in transmittance of light caused by the metal line. Examples thereof comprise a case in which a pattern having the same line density is implemented as a conductive heating pattern in the windshield of a vehicle, and a bus bar is provided at the upper end and lower end of the windshield of the vehicle, respectively. In this case, since the length of the upper end of the windshield of the vehicle is shorter than that of the lower end thereof, the upper end portion of the windshield of the vehicle may be heated more rapidly than the lower end portion thereof. However, in the case of the windshield of the vehicle, it is advantageous to heat the viewing region of a driver before anything else in order to secure the driver's view. For example, an air outlet for removing moisture and frost in the windshield of the vehicle is positioned in the viewing region of the driver in order to solve the aforementioned problems.

Accordingly, when a heating element is applied to the windshield of the vehicle, a form of a conductive heating pattern may be designed such that first, defrost may be performed or frost may be removed from the viewing region of the driver.

The conductive heating pattern is advantageous in preventing a diffraction problem caused by a single light when the pattern comprises a pattern having limited regularity rather than a regular pattern.

Examples of a method of designing a pattern having limited regularity comprise a method of modifying the position of a vertex or the curvature degree of lines of a polygon having at least three vertices.

Figure 9:
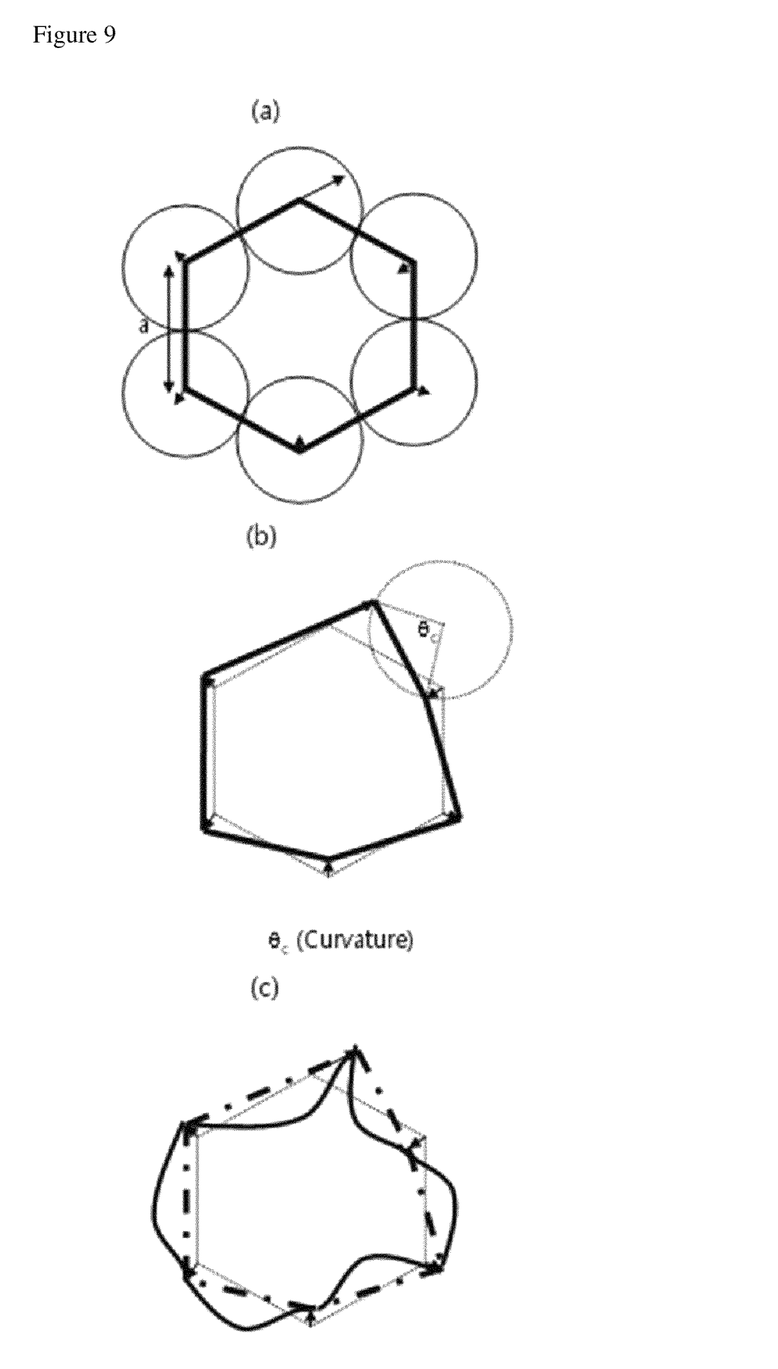
FIG. 9 illustrates a method of modifying a regular hexagon.

FIG. 9 illustrates specific examples thereof.

As an example, it is possible to use a polygon having three or more vertices in order to design a closed figure having three or more vertices. A modified figure may be designed by arbitrarily changing the position of a vertex in the form of the polygon.

Additionally, in order to prevent the changed position of a vertex from being the same as the position of another vertex, as illustrated in FIG. 9(a), a unit region in which the position of each vertex may be changed is determined, and then each vertex is moved to any point in each unit region as illustrated in FIG. 9(b).

As another example, lines of the polygon may be modified into various forms. For example, the lines may be simply a straight line, a curved line, a zig-zag line, or a combination thereof. For example, lines of the figure in FIG. 9(a) or 9(b) may be modified to various forms.

Examples of a method of forming a curved line are as follows. For example, the line may be modified to the form of a circumference of a circle passing through two adjacent vertices of the polygon. In this case, when each straight line is drawn to two vertices of the polygon from the origin of the circle, a pattern as illustrated in FIG. 9(c) may be designed by selecting a circle of which an angle (θc) between the two straight lines is constant, and then connecting each vertex along the circumference of the circle.

Figure 10:
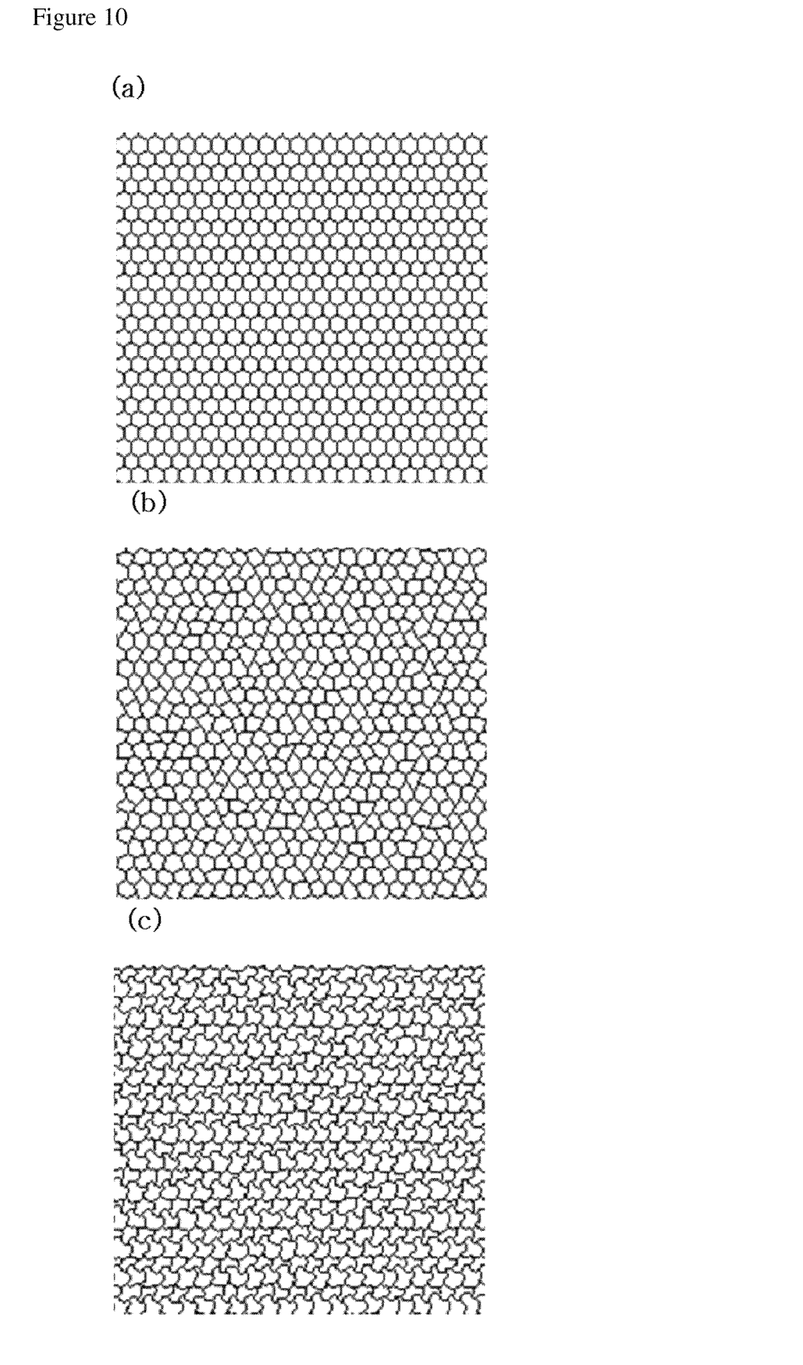
FIG. 10 illustrates a form of a pattern modified from a regular hexagon.

FIG. 10 illustrates an example of a pattern which may be prepared based on what is illustrated in FIG. 9 for each step. FIGS. 10(a), 10(b), and 10(c) are designed in the same manner as in FIGS. 9(a), 9(b), and 9(c), respectively.

According to the present invention, a transmittance deviation in a heating element may be controlled within 20% or less, 10% or less, or 5% or less. In addition, the heating element may have a transmittance deviation of 10% or less, or 5% or less with respect to any circle having a diameter of 20 cm.

The heating element according to the present invention may be applied to glass to used in various transportation means such as vehicles, ships, railways, rapid transit railways, and aircrafts, or houses or other buildings. In particular, the heating element according to the present invention is inconspicuous, and thus may also be applied to front glass or side glass of a transportation means such as vehicles, unlike the related art.

In the case of the front glass of the vehicle, the front glass itself is disposed so as to have a slope. Recently, the slope of the front glass tends to be gradually decreased further in order to minimize air resistance while the vehicle is driving. In order to prevent a problem in that the pattern may appear to be distorted vertically due to the slope of the front glass, it is advantageous to elongate the pattern vertically according to the slope when the aforementioned type of conductive heating pattern is used. For example, the conductive heating pattern may be designed so as to have a form in which the average distance between lines in the longitudinal direction is wider than the average distance between lines in the transverse direction. In an example, the average distance between lines of the conductive heating pattern in the longitudinal direction may be designed so as to be one time to ten times wider than that in the transverse direction.

Figure 11:
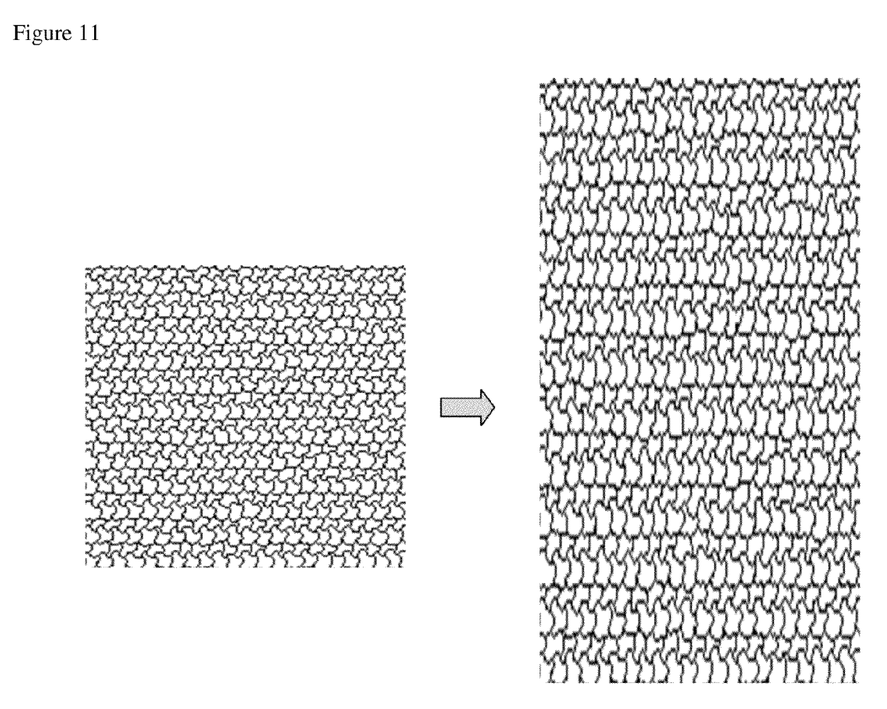
FIG. 11 illustrates an example in which when the heating element according to the present invention is applied to a windshield of a vehicle, the pattern is modified in consideration of a slope of the windshield of the vehicle.

For example, when the slope of the front glass is 30 degrees, it is preferred that the conductive heating pattern is elongated vertically by two times. FIG. 11 illustrates an example thereof.

In an example, when the heating element according to the present invention is applied to the windshield of the vehicle, the number of lines of the closed figure may be controlled according to the region classified as follows in accordance with the standards.

Figure 12:
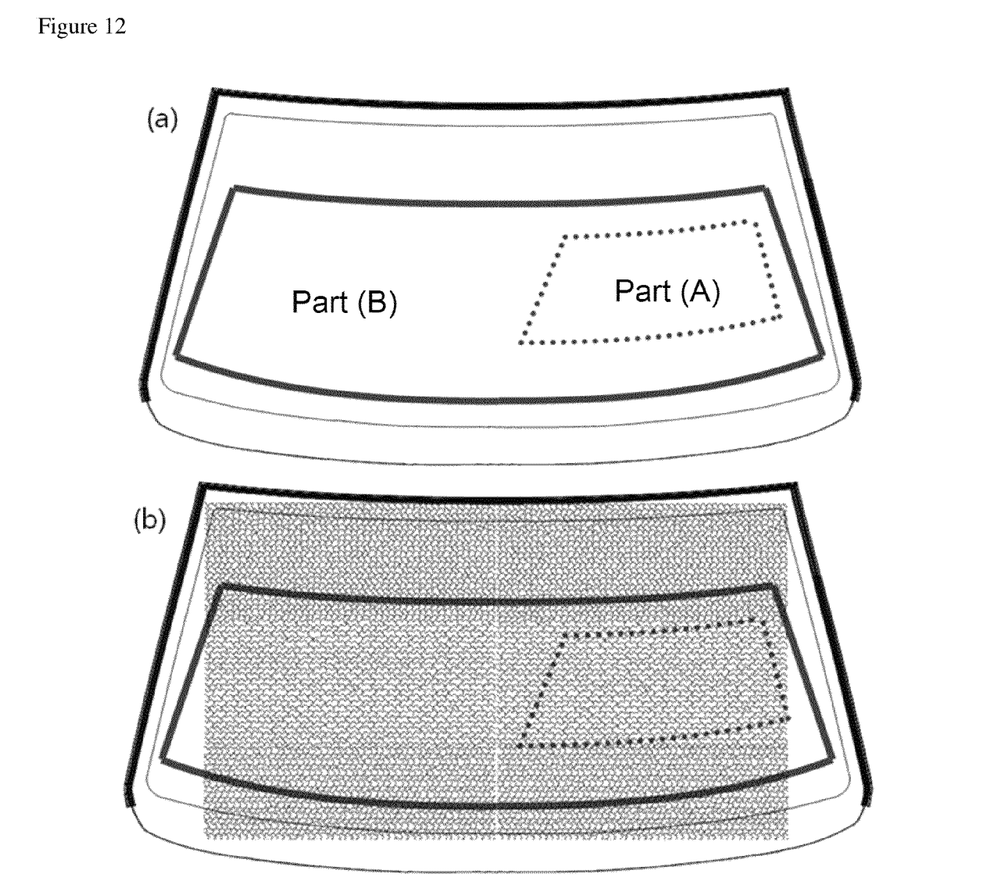
FIG. 12 illustrates an example in which the heating element according to the present invention is designed for a windshield of a vehicle.

Article 109 of the rule on the vehicle safety standards suggests a standard of removing moisture and frost by designating a driver's seat viewing part as part 'A' and the other parts comprising a passenger seat as part 'B'. The present invention may suggest a method of setting the heating value in part 'A' to a higher value. For example, a pattern as illustrated in FIG. 12 may be used.

In the present invention, the height of the lines constituting the conductive heating pattern may be from 0.2 μm to 20 μm. The distance between the lines constituting the conductive heating pattern may be designed according to the use thereof, and may be, for example, from 50 μm to 30 mm.

In the present invention, it is preferred that the base material is transparent. In this case, the base material has a visible light transmittance of 50% or more, preferably 75% or more. Specifically, as the base material, glass may be used, and a plastic substrate or a plastic film may be used. When a plastic film is used, it is preferred that a glass substrate or a plastic substrate is attached to at least one surface of the base material after the conductive heating pattern is formed. In this case, it is more preferred that a glass substrate or a plastic substrate is attached to a surface on which the conductive heating pattern of the substrate is formed. As the plastic substrate or film, a material known in the art may be used, and for example, a film having a visible light transmittance of 80% or more, such as polyethylene terephthalate (PET), polyvinylbutyral (PVB), polyethylene naphthalate (PEN), polyethersulfone (PES), polycarbonate (PC), and acetyl celluloid, is preferred. The thickness of the plastic film is preferably from 12.5 μm to 500 μm, and more preferably from 30 μm to 250 μm.

The base material may have a form of a curved surface according to the use thereof.

In the present invention, the conductive heating pattern may be composed of a conductive material. For example, the conductive heating pattern may be composed of a metal line. Specifically, it is preferred that the conductive heating pattern comprises a metal having excellent thermal conductivity. The conductive heating material may have a resistivity value from 1 microOhm cm to 200 microOhm cm. As a specific example of the conductive heating pattern material, copper, silver, carbon nanotube (CNT), copper coated with silver, and the like may be used.

The total aperture ratio of the conductive heating pattern is preferably 90% or more. Furthermore, as described above, the conductive heating pattern of the heating element according to the present invention may have an aperture ratio deviation of 2% or less while having a total aperture ratio of 90% or more.

The heating element according to the present invention may be connected to a power source for heating, and the heating value at this time is from 100 W per m² to 1,000 W per m², preferably from 200 W per m² to 700 W per m². The heating element according to the present invention has excellent heating performance even at low voltage, for example, 30 V or less, preferably 20 V or less, and thus may be usefully used even in vehicles, and the like. The resistance in the heating element is 2 Ω/square or less, preferably 1 Ω/square or less, and more preferably 0.5 Ω/square or less. In this case, the resistance value obtained has the same meaning as the surface resistance.

A black pattern may be formed in order to conceal the bus bar. The black pattern may be printed using a paste containing cobalt oxide. In this case, as the printing method, a screen printing is suitable, and the thickness thereof may be set to 10 μm to 100 μm. The pattern line and the bus bar may also be formed before or after the black pattern is formed.

The heating element according to the present invention may comprise an additional base material provided on a surface on which the conductive heating pattern of the base material is provided. The aforementioned description on the base material may be applied to the additional based material.

A bonding film may be sandwiched between the conductive heating pattern and the additional base material when the additional base material is attached thereto. In the bonding process, temperature and pressure may be controlled.

In a specific exemplary embodiment, primary bonding is performed by inserting a bonding film between a base material comprising the conductive heating pattern and an additional base material, putting the assembly into a vacuum bag, and increasing temperature while reducing pressure, or increasing temperature using a hot roll to remove air therein. In this case, the pressure, the temperature, and the time may be different according to the type of bonding film, but it is possible to gradually increase the temperature from normal temperature to 100° C. at the pressure from 300 Torr to 700 Torr. In this case, it is preferred that the time is usually set to within 1 hour. The pre-bonded laminate subjected to the primary bonding is subjected to a secondary bonding process by an autoclaving process of adding pressure thereto and increasing temperature in an autoclave. The secondary bonding may be different according to the type of bonding film, but it is preferred that the secondary bonding is performed at a pressure of 140 bar or more and a temperature approximately from 130° C. to 150° C. for 1 hour to 3 hours, preferably about 2 hours, and then the laminate is slowly cooled.

In another specific exemplary embodiment, it is possible to use a method of bonding in one step using a vacuum laminator device unlike the aforementioned two-step bonding process. Bonding may be performed by increasing temperature step by step to 80° C. to 150° C., reducing pressure (~5 mbar) until 100° C. while slowly cooling, and then adding pressure (~1,000 mbar) thereto.

As a material for the bonding film, any material may be used as long as the material has bonding force and becomes transparent after bonding. For example, a PVB film, an EVA film, a PU film and the like may be used, but the material is not limited thereto. The thickness of the bonding film is not particularly limited, but is preferably from 100 μm to 800 μm.

The present invention also provides a method for manufacturing a heating element, comprising: forming a conductive heating pattern on a base material; and forming two bus bars on the base material so as to apply voltage to both ends of the conductive heating pattern, in which the conductive heating pattern comprises a pattern in which the number of lines is controlled in at least some regions in a pattern comprising lines connecting vertices constituting a border of a closed figure having at least three vertices, according to a distance from the bus bar or along a longitudinal direction of the bus bar.

The description on the conductive heating pattern is the same as those described above.

The conductive heating pattern may also be formed by using a first method of directly printing the conductive heating pattern on the base material, and then drying or sintering the base material, a second method of laminating a metal thin film on the base material, and then patterning the metal thin film, or a third method of forming a silver pattern on a base material coated with a silver salt using a photography method, and then increasing the thickness of the line through plating until a desired surface resistance is obtained.

When a printing method as the first method among the methods is used, a paste comprising a thermal conductive material may be printed on the base material by the printing method. When the printing method is used, cost is relatively low, the manufacturing process is also simple, the line width is thin, and a precise pattern line may be formed.

The printing method is not particularly limited, and a printing method such as offset printing, screen printing, and gravure printing may be used. For example, the offset printing may be performed by using a method in which an intaglio on which a pattern is engraved is filled with a paste, is subjected to a primary transfer with a silicone rubber called a blanket, and then subjected to a secondary transfer by closely contacting the blanket with glass, but is not limited thereto.

Since most of the paste is transferred on glass due to the release property of the blanket, a separate blanket washing process is not required. The intaglio may be manufactured by precisely etching a soda lime glass on which a target pattern line is engraved, and metal or diamond-like carbon (DLC) coating may also be performed on the glass surface for durability thereof. The intaglio may also be manufactured by etching a metal plate.

In the present invention, in order to implement a more precise pattern line, the offset printing method is most preferred.

It is preferred that as the thermal conductive material, a metal having excellent thermal conductivity is used. For example, copper, silver, carbon nanotube (CNT), copper coated with silver, and the like may be used. In the present invention, the thermal conductive material may be used in the form of particles.

The paste may further comprise an organic binder in addition to the above-described thermal conductive material so as to easily perform the printing process. The organic binder may have a volatile property in the sintering process. Examples of the organic binder comprise a polyacrylic resin, a polyurethane-based resin, a polyester-based resin, a polyolefin-based resin, a polycarbonate-based resin, a cellulose resin, a polyimide-based resin, a polyethylene naphthalate-based resin, a modified epoxy and the like, but are not limited thereto.

In order to improve the attachment ability of the paste to the base material such as glass, the paste may further comprise a glass frit. The glass frit may be selected from commercially available products, but an environmentally-friendly glass frit that does not comprise a lead component may be used. In this case, the size of the glass frit used may have an average diameter of 2 micrometers or less and the maximum diameter of 50 micrometers or less.

If necessary, a solvent may be further added to the paste. Examples of the solvent comprise butyl carbitol acetate, carbitol acetate, cyclohexanone, cellosolve acetate, terpineol, and the like, but the scope of the present invention is not limited by these examples.

In the present invention, when a paste comprising a conductive material, an organic binder, a glass frit, and a solvent is used, as the weight ratio of each component, the conductive material may be present in an amount from 50 to 90% by weight, the organic binder may be present in an amount from 1 to 20% by weight, the glass frit may be present in an amount from 0.1 to 10% by weight, and the solvent may be present in an amount of 1 to 20% by weight.

Further, in order to improve the attachment ability of the paste to glass, the paste may further comprise a glass frit. If necessary, a solvent may be further added thereto.

The paste may be printed such that the line width of the line of the printing pattern after sintering is 30 μm or less, specifically from 0.1 μm to 30 μm. In addition, the paste may be printed such that the distance between lines of the printing pattern after sintering is from 50 μm to 30 mm. Furthermore, the paste may be printed such that the height of the line from the surface of the base material is from 0.2 μm to 20 μm.

In a method of patterning a metal thin film after laminating the metal thin film on a base material, which is the second method among the methods, various methods may be used as a method of laminating the metal thin film. For example, the metal thin film may also be attached to a base material using an adhesive, and may also be formed on the base material using a vacuum deposition method. As a method of patterning a metal line on a base material on which a metal thin film is laminated, the metal thin film may also be formed by patterning an etching protective layer, and then etching a portion other than the protective layer. The etching protective layer may also be formed using a photolithography method, and may also be formed using an offset printing process.

BEST MODE

Hereinafter, preferred examples will be provided for better understanding of the present invention. However, the following examples are provided only for understanding the present invention more easily, but the content of the present invention is not limited thereby.

EXAMPLE

Example 1

A Cu layer having a thickness of 2 μm was formed on a polyurethane terephthalate (PET) film through a vapor deposition method. After an etching resist material was patterned on the film through a photolitho process, a conductive heating pattern region comprising a metal pattern having a line width from 5 μm to 8 μm and a line height of 2 μm was formed through an etching process. The conductive heating pattern had an a value of 155 μm as illustrated in FIG. 7 and was formed at 20 cm wide and 15 cm long and 5 cm per region as illustrated in FIG. 5, and then was formed to have 20×10 cm² for each region by being extended by two times longitudinally as illustrated in FIG. 11. Bus bars were respectively provided on and under the conductive heating pattern, and as illustrated in FIG. 1, a pattern having the number of lines of 2:1:2 for each region according to the distance from the bus bar was formed. When 5 V was applied to the bus bars, a current of 4.6 A flowed. 10 minutes before and after the voltage was applied thereto, the temperature difference of the film was measured using a thermal imaging camera (FLIR), and as a result, the temperature was increased by 13.2° C., 27.3° C., and 13.3° C. for each region. Since the increased temperature is proportional to the heating value, it can be seen that a heating value of 1:2:1, which is inversely proportional to the ratio of the numbers of lines (2:1:2) according to the distance from the bus bar, was exhibited. In this case, when the transmittance for each region was measured, 89.3%, 90.3%, and 89.5% were obtained.

Example 2

A conductive film was formed in the same manner as in Example 1. In Example 2, a value was fixed to 158 μm, and as illustrated in FIG. 5, a pattern with the number of lines for each region of 4:3:4 was formed according to the distance from the bus bar. When 5 V was applied to the bus bars, a current of 6.0 A flowed. 10 minutes before and after the voltage was applied thereto, the temperature difference of the film was measured using a thermal imaging camera (FLIR), and as a result, the temperature was increased by 21.3° C., 28.1° C., and 19.1° C. for each region. Since the increased temperature is proportional to the heating value, it can be seen that a heating value of 3:4.0:2.7, which is nearly inversely proportional to the ratio of the numbers of lines (4:3:4) according to the distance from the bus bar, was exhibited. In this case, when the transmittance for each region was measured, 89.2%, 90.1%, and 89.6% were obtained.

Example 3

A conductive film was formed in the same manner as in Example 1. In Example 3, a value was fixed to 135 μm, and as illustrated in FIG. 6, a pattern with the numbers of lines for each region of 20:12:15 according to the distance from the bus bar was formed. When 5 V was applied to the bus bars, a current of 5.4 A flowed. 10 minutes before and after the voltage was applied thereto, the temperature difference of the film was measured using a thermal imaging camera (FLIR), and as a result, the temperature was increased by 15.8° C., 28.3° C., and 19.0° C. for each region. Since the increased temperature is proportional to the heating value, it can be seen that a heating value of 12:21:14, which is nearly inversely proportional (12:20:16) to the ratio of the numbers of lines (20:12:15) according to the distance from the bus bar, was exhibited. In this case, when the transmittance for each region was measured, 88.4%, 89.8%, and 89.2% were obtained.

The invention claimed is:

1. A heating element comprising:
    a substrate;
    a conductive heating pattern provided on the substrate; and
    two bus bars provided so as to apply voltage to both ends of the conductive heating pattern, respectively,
    wherein the conductive heating pattern comprises a pattern in which the number of lines is controlled in at least some regions in a pattern comprising lines connecting vertices constituting a border of a closed figure having at least three vertices, according to a distance from the bus bar or along a longitudinal direction of the bus bar, and the conductive heating pattern has a form in which an average distance between lines in a longitudinal direction is wider than an average distance between lines in a transverse direction, and
    the closed figure comprises one or two or more of a closed figure having five vertices, a closed figure having six vertices, a closed figure having seven vertices, and a closed figure having eight vertices;
    lines of which the number is controlled are lines vertical to a longitudinal direction of at least one of the bus bars,
    the conductive heating pattern comprises at least two regions having different average numbers of lines per unit area, and
    an aperture ratio for each region is 90% or more, and an aperture difference between regions is 2% or less.

2. The heating element of claim 1, wherein the closed figure is composed of a closed figure having four vertices.

3. The heating element of claim 1, wherein the closed figure is composed of a closed figure having six vertices.

4. The heating element of claim 1, wherein the closed figure is a figure in which a position of each vertex of a polygon is changed in a specific unit region, a figure in which a line of a polygon is modified in a form where the vertices are connected to each other along a circumference of a circle by selecting the circle such that an angle between an origin of the circle among circles passing through two adjacent vertices of the polygon and straight lines each connecting two vertices of the polygon so as to be constant, or a combination thereof.

5. The heating element of claim 1, wherein the lines comprise a straight line, a curved line, a zig-zag line or a combination thereof.

6. The heating element of claim 1, wherein lines of which the number is controlled are lines facing each other based on a distance direction between two bus bars.

7. The heating element of claim 1, wherein the closed figure is a figure selected from the group consisting of a right tetragon, a rectangle, a right hexagon, and a hexagon having two lines vertical to at least one of the bus bars; or a figure in which at least one of a position of a vertex and a curvature degree of line is modified from the figure.

8. The heating element of claim 1, wherein a ratio of an average number of lines per unit area among the regions is an integer ratio.

9. The heating element of claim 1, wherein the conductive heating pattern comprises three regions having different average numbers of lines per unit area.

10. The heating element of claim 9, wherein in the three regions, the ratio of the average numbers of lines per unit area among the regions is a value of 0.8 or more and less than 1.

11. The heating element of claim 1, wherein the region comprises part 'A' and part 'B' in accordance with Article 109 of the rule on the vehicle safety standards.

12. The heating element of claim 1, wherein each length of the lines is from 100 μm to 800 μm, and a line width thereof is from 0.1 μm to 30 μm.

13. The heating element of claim 1, wherein the conductive heating pattern is composed of a metal line.

14. The heating element of claim 1, wherein the heating element has a transmittance deviation of 10% or less with respect to any circle having a diameter of 20 cm.

15. A windshield for a vehicle comprising the heating element of claim 1.

* * * * *